US007575687B2

(12) United States Patent
Kurth et al.

(10) Patent No.: US 7,575,687 B2
(45) Date of Patent: Aug. 18, 2009

(54) MEMBRANES AND METHODS USEFUL FOR CAUSTIC APPLICATIONS

(75) Inventors: Christopher J. Kurth, Chaska, MN (US); Isaac K. Iverson, Minnetonka, MN (US); Philip M. Rolchigo, Clifton Park, NY (US); Steven D. Kloos, Chanhassen, MN (US); Leonard T. Hodgins, Closter, NJ (US)

(73) Assignee: GE Osmonics, Inc., Minnetonka, MN (US)

( * ) Notice: Subject to any disclaimer, the term of this patent is extended or adjusted under 35 U.S.C. 154(b) by 308 days.

(21) Appl. No.: 11/495,810

(22) Filed: Jul. 28, 2006

(65) Prior Publication Data
US 2007/0039885 A1  Feb. 22, 2007

Related U.S. Application Data

(63) Continuation-in-part of application No. 11/204,425, filed on Aug. 16, 2005.

(51) Int. Cl.
B01D 61/00 (2006.01)
B01D 39/14 (2006.01)

(52) U.S. Cl. .................. 210/651; 210/652; 210/653; 210/500.41; 210/500.38; 423/121; 423/122; 423/130

(58) Field of Classification Search ......... 210/651–653, 210/500.27, 500, 39, 500.38, 639; 423/121–122, 423/130
See application file for complete search history.

(56) References Cited

U.S. PATENT DOCUMENTS

| 3,744,642 | A | | 7/1973 | Scala et al. |
| 4,277,344 | A | | 7/1981 | Cadotte |
| 4,357,220 | A | * | 11/1982 | Eisenmann ............... 210/644 |
| 4,676,959 | A | | 6/1987 | The et al. |
| 4,678,477 | A | | 7/1987 | The et al. |
| 4,761,234 | A | | 8/1988 | Uemura et al. |
| 4,765,897 | A | | 8/1988 | Cadotte et al. |
| 4,778,596 | A | | 10/1988 | Linder et al. |
| 4,786,482 | A | | 11/1988 | The et al. |
| 4,859,384 | A | | 8/1989 | Fibiger et al. |
| 4,950,404 | A | | 8/1990 | Chau |
| 4,960,517 | A | | 10/1990 | Cadotte |
| 4,983,291 | A | | 1/1991 | Chau et al. |
| 5,387,405 | A | * | 2/1995 | Connelly et al. ........... 423/122 |
| 5,527,524 | A | | 6/1996 | Tomalia et al. |
| 5,582,725 | A | | 12/1996 | McCray et al. |
| 5,627,217 | A | | 5/1997 | Rilling et al. |
| 5,693,227 | A | | 12/1997 | Costa et al. |
| 5,814,127 | A | * | 9/1998 | Li .......................... 95/47 |
| 6,204,231 | B1 | | 3/2001 | Patten et al. |
| 6,454,958 | B1 | | 9/2002 | Loehr |
| 6,565,747 | B1 | | 5/2003 | Shintani et al. |
| 6,783,711 | B2 | | 8/2004 | Kurth et al. |
| 6,837,996 | B2 | | 1/2005 | Kurth et al. |
| 6,987,150 | B2 | | 1/2006 | Kurth et al. |
| 2003/0121857 | A1 | | 7/2003 | Kurth et al. |
| 2004/0052706 | A1 | | 3/2004 | Armstrong et al. |

FOREIGN PATENT DOCUMENTS

| EP | 1020218 | 7/2000 |
| EP | 1 044 718 | 10/2000 |
| GB | 976 392 | 11/1964 |
| WO | WO 95/27681 | 10/1995 |
| WO | WO 01/89654 | 11/2001 |
| WO | WO 01/90223 | 11/2001 |
| WO | WO 01/91873 | 12/2001 |
| WO | WO 02/051753 | 7/2002 |
| WO | WO 2004/014805 | 2/2004 |

OTHER PUBLICATIONS

Evers et al., "Poly-m-phenoxylene Sulfonamides", *Journal of Polymer Science*, Part A-1, vol. 5, pp. 935-940, 1967.
Poslyakova et al., "Chemical Resistance of Ultrafiltration Membranes", Plast Massy, No. 1, p. 20, 1995.
Database WPI Week 197539, Derwent Publications Ltd., London, GB, 1975-64595W.
Armstrong et al., "A New Membrane Process to Purify Bayer Liquors", *Proceedings of the 6th International Alumina Quality Workshop*, 6 pgs., 2002.
Awadalla et al., "Separation of Humic Acids from Bayer Process Liquor by Membrane Filtration", *Separation Science and Technology*, 29(8). pp. 1011-1028, 1994.
Awadalla et al., "Opportunities for Membrane Technologies in the Treatment of Mining and Mineral Process Streams and Effluents", *Separation Science and Technology*, 29(10). pp. 1231-1249, 1994.
Clegg et al., "Development of Liquor Purification at Alcan Gove", *Proceedings of the 7th International Alumina Quality Workshop*, 12 pgs., 2005.
Gillespie, Bayer Liquid Purification by Nano-Filtration Membranes, *Proceedings of the 7th International Alumina Quality Workshop*, 10 pgs., 2005.
Marciano et al., "Nanofiltration of Bayer process solutions", *Journal of Membrane Science*, 281, pp. 260-267, 2006.
Trushinski et al., "Polysulfonamide thin-film composite reverse osmosis membranes", *Journal of Membrane Science*, 143, pp. 181-188, 1998.
SeIRO MPT-34-ph Stable Membrane, Koch Membrane Systems Product Description, 2 pgs., 06/04 RO Spec. Sheet.
Database WPI Week 197539, Derwent Publications Ltd., London, GB, 1975-64595W, Mar. 3, 1975.

* cited by examiner

*Primary Examiner*—Ana M Fortuna
(74) *Attorney, Agent, or Firm*—Viksnins Harris & Padys PLLP

(57) ABSTRACT

The invention provides methods for purifying caustic feed streams using membranes that comprise polysulfonamide matrices.

24 Claims, No Drawings

MEMBRANES AND METHODS USEFUL FOR CAUSTIC APPLICATIONS

PRIORITY OF INVENTION

This application is a Continuation-in-Part of co-pending U.S. patent application Ser. No. 11/204,425, filed 16 Aug. 2005. The entire content of this U.S. Patent Application is hereby incorporated herein by reference.

BACKGROUND OF THE INVENTION

Semipermeable membranes play an important part in industrial processing technology and other commercial and consumer applications. Examples of their applications include, among others, biosensors, transport membranes, drug delivery systems, water purification systems, optical absorbers, and selective separation systems for aqueous and organic liquids carrying dissolved or suspended components.

The Bayer process is used industrially to recover aluminum hydroxide from bauxite. U.S. Pat. No. 4,786,482 reports the use of porous polysulfone hollow fibers coated with a semipermeable sulfonated polysulfone membrane to reduce the levels of organic and inorganic impurities in caustic liquors. Although this patent issued more than 15 years ago, membranes are not routinely used in industry for purifying highly caustic streams, because membranes having a commercially viable combination of flow, rejection, and caustic stability have not been identified. Accordingly, there is currently a need for materials and methods that can be used to remove impurities from caustic streams, such as the caustic streams generated by a Bayer alumina recovery process.

SUMMARY OF THE INVENTION

Applicant has unexpectedly found that polysulfonamide membranes (including primary sulfonamide membranes) are particularly useful for fractionating the components of caustic feed streams. Polysulfonamide membranes have been found to possess a combination of flow, rejection, and caustic stability that make them a viable commercial option for fractionating caustic streams such as those generated by a Bayer alumina recovery process. For example, sulfonamide membranes can be used to concentrate organic impurities in the feed liquor prior to an incinerator in order to lower the volume of material incinerated and/or to increase the amount of organics incinerated. These findings are particularly surprising for primary sulfonamide containing membranes, because it was previously assumed that primary sulfonamide protons would be labile in a caustic enviormnent, and that their removal would lead to membrane swelling and decreased performance.

Accordingly, the invention provides a method comprising contacting a membrane comprising a polysulfonamide matrix with a feed solution having a pH of at least about 11, so that the feed solution is fractionated into a permeate and into a retentate.

DETAILED DESCRIPTION OF THE INVENTION

Definitions

As used herein, a "residue" is the portion of a reactant that remains as part of a matrix after it has reacted and consists of atoms present in the reactant prior to reaction. Additional atoms may have left during reaction, and other transformations such as a ring opening may have occurred, which lead to differences in structure between residues and reactants. For example, an aryl sulfonyl chloride reacted with an amine group of a matrix would form a sulfonamide linked aryl residue; the "residue" consists of the aryl ring, any groups substituted on the aryl ring, and the sulfur dioxide moiety; the nitrogen would not be part of the residue, as it was part of the precursor matrix, not of the reactant. If in this example the aryl sulfonyl chloride reactant was p-toluenesulfonyl chloride, the residue would be p-$CH_3$—$C_6H_4$—$SO_2$—.

As used herein, an "insoluble branched condensation polymer matrix" is a polymer that posses at least some residues that have greater than two sites where monomers have added, leading to a branch point in the polymer chain. The residues bound to the branch points may be short and consist of only 1 additional residue, or may be of large molecular weight and contain hundreds or even thousands of additional residues. The residues may also connect with another branch point and form a crosslink. The branch points may fall primarily along a main polymer giving a comb-like structure, or there may be a series of branches on other branches giving a dendritic structure.

As used herein, an "insoluble" matrix is a matrix that is incapable of forming a one phase liquid solution with a suitable solvent, without first breaking chemical bonds within the matrix itself. Insoluble matrices typically result from crosslinking, crystallinity, or other phenomena.

Condensation polymers typically comprise repeating functional groups, such as esters, amides, sulfonamides, urethanes, sulfides, sulfones, ethers, or other olefinic groups, within their polymeric backbone. They are often prepared from reactants that lose atoms during the formation of the polymer, resulting in a polymer that comprises residues of the reactants. For example, a condensation polymer can be formed by reacting a polysulfonyl halide reactant with a polyamine reactant to provide a polysulfonamide condensation polymer; during the polymer forming condensation reaction, HCl is lost from the reactants.

As used herein, the term "matrix" means a regular, irregular and/or random arrangement of polymer molecules such that on a macromolecular scale the arrangements of molecules may show repeating patterns, or may show series of patterns that sometimes repeat and sometimes display irregularities, or may show no pattern. The molecules may or may not be cross-linked. On a scale such as would be obtained from SEM, X-Ray or FTNMR, the molecular arrangement may show a physical configuration in three dimensions like those of networks, meshes, arrays, frameworks, scaffoldings, three dimensional nets or three dimensional entanglements of molecules. The matrix may be non-self supporting. Preferably, the matrix is in the form of a thin film with an average thickness from about 5 nm to about 10000 nm, and more preferably about 5 to about 400 nm. In usual practice, the matrix is grossly configured as an ultrathin film or sheet.

As used herein, the term "membrane" means a semipermeable material which can be used to separate components of a feed fluid into a permeate that passes through the membrane and a retentate that is rejected or retained by the membrane.

As used herein, the term "composite membrane" means a matrix layered or coated on at least one side of a support material.

As used herein, the term "support material" means any substrate upon which the matrix can be formed or applied. Included are semipermeable membranes especially of the micro- and ultrafiltration kind, fabric, filtration materials as well as others. The substrate may be porous, microporous or non-porous.

As used herein, the term "aryl residue" is a residue as defined herein, that includes an aryl group or a heteroaryl group.

As used herein, the term "aryl group" includes a 6-20 carbon monocyclic, bicyclic, or polycyclic ring system in which at least one ring is aromatic. An aryl group can optionally be substituted with one or more substituents independently selected from cyano, halo, hydroxy, mercapto, nitro, carboxy, sulfo, $(C_1-C_{20})$alkyl, $(C_1-C_{20})$alkoxy, $(C_1-C_{20})$alkoxycarbonyl, $(C_1-C_{20})$alkanoyloxy, phenyl, or —$NR_aR_b$, wherein $R_a$ and $R_b$ may be the same or different and are chosen from hydrogen $(C_1-C_{20})$alkyl, $(C_1-C_{20})$alkoxy, $(C_1-C_{20})$alkoxycarbonyl, and $(C_1-C_{20})$alkanoyloxy, or wherein $R_a$ and $R_b$ together with the nitrogen to which they are attached form a pyrrolidino, piperidino, morpholino, or thiomorpholino ring; wherein each $(C_1-C_{20})$alkyl, $(C_1-C_{20})$alkoxy, $(C_1-C_{20})$alkoxycarbonyl, and $(C_1-C_{20})$alkanoyloxy is optionally substituted with one or more cyano, halo, hydroxy, mercapto, nitro, carboxy, sulfo, oxo (=O), thioxo (=S) or —$NR_aR_b$ and wherein one or more carbons of each $(C_1-C_{20})$alkyl, $(C_1-C_{20})$alkoxy, $(C_1-C_{20})$alkoxycarbonyl, and $(C_1-C_{20})$alkanoyloxy can optionally be replaced with —O—, —S—, or —$NR_c$—, wherein each $R_c$ is independently hydrogen, $(C_1-C_6)$alkyl, $(C_1-C_6)$alkoxy, $(C_1-C_6)$alkoxycarbonyl, and $(C_1-C_6)$alkanoyloxy. Examples of 6-20 carbon monocyclic, bicyclic, or polycyclic ring systems in which at least one ring is aromatic include phenyl, naphthyl, indol, anthrocenyl, phenanthryl, perylene, pyrenyl, tetrahydronaphthyl benzopyrene, and azulene.

As used herein, the term "heteroaryl group" is a 1-20 carbon monocyclic, bicyclic, or polycyclic ring system in which at least one heteroatom (i.e. non-carbon atom) containing ring is aromatic. A heteroaryl group can optionally be substituted with one or more substituents independently selected from cyano, halo, hydroxy, mercapto, nitro, carboxy, sulfo, $(C_1-C_{20})$alkyl, $(C_1-C_{20})$alkoxy, $(C_1-C_{20})$alkoxycarbonyl, $(C_1-C_{20})$alkanoyloxy, or —$NR_aR_b$, wherein $R_a$ and $R_b$ may be the same or different and are chosen from hydrogen $(C_1-C_{20})$alkyl, $(C_1-C_{20})$alkoxy, $(C_1-C_{20})$alkoxycarbonyl, and $(C_1-C_{20})$alkanoyloxy, or wherein $R_a$ and $R_b$ together with the nitrogen to which they are attached form a pyrrolidino, piperidino, morpholino, or thiomorpholino ring; wherein each $(C_1-C_{20})$alkyl, $(C_1-C_{20})$alkoxy, $(C_1-C_{20})$alkoxycarbonyl, and $(C_1-C_{20})$alkanoyloxy is optionally substituted with one or more cyano, halo, hydroxy, mercapto, nitro, carboxy, sulfo, oxo (=O), thioxo (=S) or —$NR_aR_b$ and wherein one or more carbons of each $(C_1-C_{20})$alkyl, $(C_1-C_{20})$alkoxy, $(C_1-C_{20})$alkoxycarbonyl, and $(C_1-C_{20})$alkanoyloxy can optionally be replaced with —O—, —S—, or —$NR_c$—, wherein each $R_c$ is independently hydrogen, $(C_1-C_6)$alkyl, $(C_1-C_6)$alkoxy, $(C_1-C_6)$alkoxycarbonyl, and $(C_1-C_6)$alkanoyloxy. Examples of 1-20 carbon monocyclic, bicyclic, or polycyclic ring system in which at least one heteroatom (i.e. non-carbon atom) containing ring is aromatic include pyridyl, thienyl, furyl, pyrrole, thiophene, pyrimidine, imidazole, indole, isoindole, purine, quinoline, isoquinoline, acridine, benzothiophene, benzofuran, benzimidazole, oxazole, and thiazole.

A "primary sulfonamide polymer" means a solid phase polymer comprising one or more sulfonamide groups (—$SO_2NH$—) in the polymer backbone. Typically, such polymers are made at least in part by allowing one or more primary amines to react with one or more sulfonyl halides.

The "moles of titratable alkali" in a given amount of solution can be determined by measuring the moles of a monoprotonic acid (for example hydrochloric acid) that must be added to provide a neutral (pH 7) solution.

Caustic Applications

It has surprisingly been found that polysulfonamide membranes have the ability to conduct separations in extreme high pH applications, even at high temperatures. Additionally, sulfonamide membranes unexpectedly yield stable performance under such conditions over significant periods of time. Accordingly, sulfonamide membranes can be used to conduct separations on caustic feed streams on a commercial scale.

Membranes

In one embodiment of the invention the polysulfonamide membrane is a membrane of the invention as described herein. In addition to the polysulfonamide membranes described herein, suitable polysulfonamide membranes for use in the methods of the invention are also described in U.S. Patent Application Number US 2003/121857A1 and U.S. patent application Ser. No. 11/204,425. One particular polysulfonamide membrane that can be used for fractionating materials in a caustic environment is a Desal KH membrane, which is marketed by GE Osmonics. The KH membrane functions as a nanofilter in high pH applications by permeating water and hydroxide salts while retaining dissolved impurities. This is useful for recovering valuable materials from a caustic stream, by purifying the caustic for reuse or resale, or both.

In one embodiment, the membrane is a semipermeable membrane in flatsheet form (e.g. where the membrane is rolled up into a spiral wound module).

In one embodiment, the membrane is present on the surface of porous hollow fibers (for example, see U.S. Pat. No. 4,786,482).

Applications

In one embodiment, the methods and membranes of the invention can be used in nanofiltration applications to process high pH solutions (e.g., to pass alkali).

In another embodiment the methods and membranes of the invention can be used in reverse-osmosis applications to process high pH solutions (e.g., to concentrate alkali).

In one embodiment, the methods and membranes of the invention can be used to process mine mineral ore extracts. For example, in the Bayer process for Alumina manufacture, the membranes and methods of the invention can be used to concentrate liquor burner feed, to remove humate from incoming liquor feed, to remove impurities (e.g. organics) from lime treated seed wash feed, to remove impurities (e.g. organics) from washer overflow, or to remove impurities (e.g. organics) from spent liquor feed.

In one embodiment, the methods and membranes of the invention can be used with caustic etching baths where removal of impurities can speed etch rates and minimize waste generation.

In one embodiment, the methods and membranes of the invention can be used with CIP (clean in place) solutions widely used in the food industry where purification could reduce caustic requirements and decrease the amount of waste generated.

In one embodiment, the methods and membranes of the invention can be used in the pulp and paper industry for purification of alkaline bleach solutions, amongst other streams.

Backings

Any suitable backing can be used for the membranes of the invention. Typically, the backing will comprise a non-woven fabric that has a thickness of about 4 to about 6 mils and will have similar air permeability and strength characteristics to conventional composite membrane non-woven backings. The non-woven fabric is typically composed of thermoplastic fibers that are inherently stable to the strong caustic conditions of the invention. In one embodiment, the backing material for the polysulfonamide composite membrane is a polyphenylene sulfide (PPS) material.

Separations

The methods and membranes of the invention can be used to fractionate a variety of solution components (e.g. impurities) into retentate or permeate fractions. For example, the impurity can be an inorganic material (e.g. a metal ion, a metal salt, etc.) or an organic material (e.g. a small organic molecule, a humate, an amino acid, a peptide, a protein, a lipid (e.g., a fatty acid) or an oil (e.g., a petroleum substance)). In one embodiment the impurity has a molecular weight of at least about 200 amu. In another embodiment the impurity has a molecular weight of at least about 500 amu. In another embodiment the impurity has a molecular weight of at least about 1000 amu. In another embodiment the impurity has a molecular weight of at least about 2000 amu.

Specific Embodiments

In one embodiment the feed solution has a pH of at least about 12.

In one embodiment the feed solution has a pH of at least about 14.

In one embodiment the feed solution comprises at least about 15% sodium hydroxide by weight.

In one embodiment the feed solution comprises at least about 20% sodium hydroxide by weight.

In one embodiment the feed solution comprises at least about 25% sodium hydroxide by weight.

In one embodiment the feed solution comprises at least 2.5 moles of titratable alkali per liter.

In one embodiment the feed solution comprises at least 5.0 moles of titratable alkali per liter.

In one embodiment the feed solution comprises at least 6.25 moles of titratable alkali per liter.

In one embodiment the feed solution is at a temperature of at least about 50° C.

In one embodiment the feed solution is at a temperature of at least about 75° C.

In one embodiment the feed solution is at a temperature of at least about 100° C.

In one embodiment the feed solution comprises at least one impurity that is concentrated in the permeate or in the retentate.

In one embodiment the feed solution comprises at least one impurity that is concentrated in the retentate.

In one embodiment the rejection of the impurity is at least about 35%.

In one embodiment the rejection of the impurity is at least about 50%.

In one embodiment the rejection of the impurity is at least about 75%.

In one embodiment the rejection of the impurity is at least about 90%.

In one embodiment the rejection of the impurity is at least about 98%.

In one embodiment the membrane rejects at least 35% of the impurity following at least 48 hours of contact with the feed solution.

In one embodiment the membrane rejects at least 50% of the impurity following at least 48 hours of contact with the feed solution.

In one embodiment the membrane rejects at least 75% of the impurity following at least 48 hours of contact with the feed solution.

In one embodiment the membrane rejects at least 90% of the impurity following at least 48 hours of contact with the feed solution.

In one embodiment the membrane rejects at least 98% of the impurity following at least 48 hours of contact with the feed solution.

In one embodiment the membrane rejects at least 35% of the impurity following at least 5 days of contact with the feed solution.

In one embodiment the membrane rejects at least 50% of the impurity following at least 5 days of contact with the feed solution.

In one embodiment the membrane rejects at least 75% of the impurity following at least 5 days of contact with the feed solution.

In one embodiment the membrane rejects at least 90% of the impurity following at least 5 days of contact with the feed solution.

In one embodiment the membrane rejects at least 98% of the impurity following at least 5 days of contact with the feed solution.

The invention will now be illustrated by the following non-limiting Examples.

EXAMPLES

Example 1

A commercially available polysulfonamide KH membrane (from GE Water & Process Technologies) was wet out with deionized water DI water for 20 minutes. After removing the water, a 1% (w/w) NaOH aqueous solution was poured on the face of the membrane for 1 minute and drained. A brief rinse of the membrane surface with about 10 mL of water was performed. The wet membrane was laid face up and immediately a methanol solution of p-nitrobenzenesulfonyl chloride or p-methoxybenzene-sulfonyl chloride was poured onto the membrane. The membrane was tested on a high caustic Bayer process liquor in stirred cells with 600 psig pneumatic pressure at room temperature RT. The resulting permeate was examined with UV-vis absorbance and decreases in the absorbance ABS was interpreted evidence of removing humic degradation organic compounds. The ratio of Absorbance of permeate divided by feed plotted at various wavelengths is shown below.

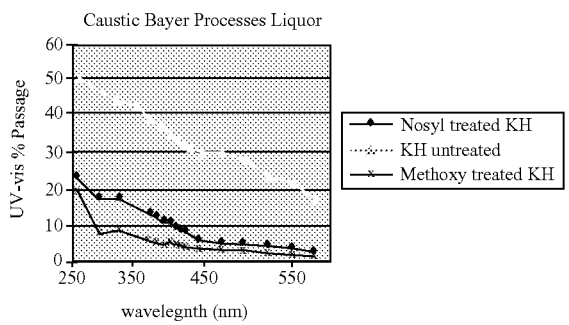

Example 2

A commercially available polysulfonamide KH membrane (from GE Water & Process Technologies) was soaked in 25% sodium hydroxide by weight in water for 4 days then coupons were cut and placed in steel dead end test cells equipped with magnetic stirring. The cells were charged with 25% sodium hydroxide by weight in water at room temperature. The cells were pressurized with nitrogen to various pressures from 100 psig to 650 psig. The ability of the KH membrane to yield permeate flow as a function of pressure is shown in the following plot. The Y-intercept value of 0 psi indicates that no NaOH is rejected.

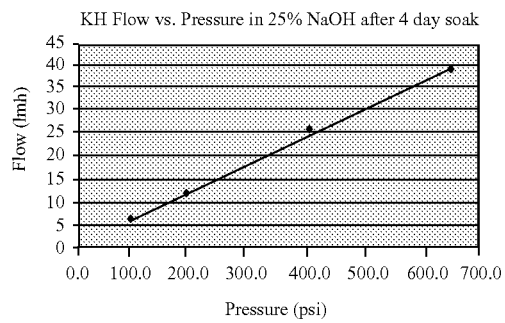

Lmh is a notation of flux, in units of liters/($m^2$*hr).

Example 3

A commercially available polysulfonamide KH membrane (from GE Water & Process Technologies) was placed in stirred cells as in Example 2. The cells were charged with 2% by weight NaOH water solution that also contained 100 ppm of 1,3,6-naphthalene trisulfonate, sodium salt ("NTSA", MW 434). The cells were pressurized for 1 hr at 200 psig with nitrogen and stirring. The rejection of the aromatic compound was measured by recording the UV absorbance of the feed and permeate solutions at 287 nm. The % rejection of NTSA was 73%. The flux was measured at 200 psig to be 57 LMH. (LMH is a notation of flux, in units of liters/($m^2$*hr).)

Example 4

A sulfonamide membrane was prepared as follows. An interfacially prepared composite sulfonamide membrane was prepared using a support membrane comprising a 4 mil polyphenylenesulfide backing material, with the support membrane having membrane characteristics of an A value of 40-60, and a molecular weight cut-off MWCO of about 3,000 Daltons. This support membrane was then coated with an aqueous solution of triethylenetetramine and dimethylaminopyridine and the excess removed by an airknife. An isoparrafin solution of napthalenetrisulfonyl chloride was then applied and placed in an oven. The rejection characteristics of this membrane when tested on magnesium sulfate in water are similar to the rejection characteristics of commercial membrane KH, which uses a polyester backing material. This membrane was then cut into 28 coupons and soaked in 25% by weight NaOH in water at 65 deg C. A set of four coupons were removed after 7 days, 14 days, 21 days, 35 days, 58 days, 242 days, and 327 days respectively. After each soaking period, the four coupons were placed in the stirred pressure cells described in example 2 and the cells were charged with freshly made solutions of 1000 ppm sodium humate (from Aldrich Chemical Co) in 25% by weight NaOH water solution. The cells were pressurized to 600 psig at room temperature (20-25 deg C.) and allowed to permeate 1 hr before testing with stirring. The flux and rejection values are given below. Percent rejection was measured with UV spectrometer as described in example 3 with the exception that the UV wavelength was 256 nm. As the plots show, the 7 day soak values produced coupons which had an average flux of 7.9 (+/−2.6) LMH at 600 psig and a % rejection value of 91% (+/−4%). The 327 day soak in the hot caustic produced coupons which had an average flux of 4.4 (+/−2.0) LMH at 600 psig and a % rejection value of 88% (+/−1%).

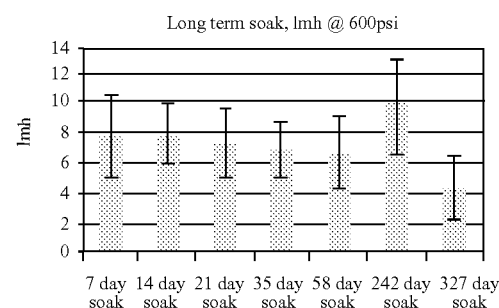

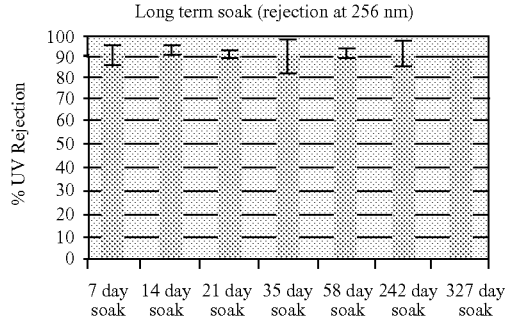

Lmh is a notation of flux, in units of liters/($m^2$*hr).

Example 5

A membrane prepared as in Example 4 was tested in stirred pressure cells (as those used in Example 2). The coupon was placed dry into the cell, and the cell was charged with 300 mL of a process solution obtained from a Bayer alumina refinery. The solution was a spent Bayer liquor sample from the main Bayer circuit and was filtered to remove suspended solids prior to adding to the membrane test cell. The cell was pressurized to 700 psig with nitrogen at 25 deg C and allowed to permeate 1 hr before data was collected. The flux was measured to be 2.0 LMH at 700 psig. The permeate and feed were examined with UV-vis spectrometer at 400 nm after diluting with known quantities of water so that the absorbance was within range of the detector. The % rejection at 400 nm was determined to by 80%. The permeate and feed samples were also analyzed with a combustion TOC analyzer after dilutions (similar to those used in the UV-vis measurements). The TOC % rejection was determined to be 55%.

Example 6

A membrane prepared as in Example 4 was rolled into a 2 inch (diameter) membrane element using standard industry procedures for making spiral wound membrane elements. This element had standard polypropylene feed spacers and permeate carriers (sheet materials) and the membrane envelop packets were glued together with epoxy glue. The element was encased in fiberglass and stainless steel anti-telescoping devices were glued on each cylinder end with epoxy. The element was placed in a steel housing and was subjected to a 1% NaOH by weight water solution containing 1000 ppm sodium humate (Aldrich Chemical Co) at 150 psig and 3000 mL/min cross-flow rate. After seven days of continuous run time the flux was measured to by 37 LMH at 150 psig and 24 deg C. The permeate and feed samples were examined by UV-vis spectroscopy at 350 nm. The % rejection in the permeate was 96%.

Example 7

A membrane element prepared similar to that in Example 6 using membrane prepared as in Example 4 was tested in the same apparatus as Example 6. The element was subjected to Bayer process liquor similar to that used in Example 5. The test was conducted for 1 hr at 500 psig and 25 deg C. The flux was 4.6 LMH at 500 psig. The UV-vis rejection was measured similar to the method described in Example 5 and was found to be 79% at 400 nm. The TOC rejection was measured similar to the method described in Example 5 and found to be 45%.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

We claim:

1. A method comprising contacting a membrane comprising a polysulfonamide matrix with a feed solution having a pH of at least about 11, so that the feed solution is fractionated into a permeate and into a retentate, wherein the polysulfonamide matrix comprises, 1) an insoluble branched condensation polymer matrix comprising reactant residues, and 2) a plurality of aryl residues that differ from said reactant residues and that are terminally-linked to the insoluble branched condensation polymer matrix through sulfonamide bonds.

2. The method of claim 1 wherein the membrane comprises a primary polysulfonamide polymer.

3. The method of claim 1 wherein the feed solution comprises at least 5.0 moles of titratable alkali per liter.

4. The method of claim 1 wherein the feed solution comprises at least one impurity that is concentrated in the retentate.

5. The method of claim 4 wherein the membrane rejects at least 50% of the impurity following at least 48 hours of contact with the feed solution.

6. The method of claim 4 wherein the membrane rejects at least 50% of the impurity following at least 5 days of contact with the feed solution.

7. The method of claim 4 wherein the impurity is a humic substance.

8. The method of claim 1 wherein the membrane, after soaking in a solution comprising 6.25 molar titratable alkali at 65° C. for 7 days, possesses a flux of at least 3 LMH at 400 psi and demonstrates at least 80% rejection of sodium humate as measured by UV-Vis spectrometry at 400 nm; and wherein the feed solution comprises a) 6.25 molar titratable alkali, and b) at least 1 gram/liter of dissolved sodium humate.

9. The method of claim 1 wherein the membrane, after soaking in a solution comprising 6.25 molar titratable alkali at 65° C. for 30 days, possesses a flux of at least 3 LMH at 400 psi and demonstrates at least 80% rejection of sodium humate as measured by UV-Vis spectrometry at 400 nm; and wherein the feed solution comprises a) 6.25 molar titratable alkali, and b) at least 1 gram/liter of dissolved sodium humate.

10. The method of claim 1 wherein the feed solution is a Bayer process liquor.

11. The method of claim 10 wherein the membrane is part of a spiral wound module.

12. The method of claim 10 wherein the permeate is recycled in a closed loop Bayer process.

13. The method of claim 1 wherein the feed solution is associated with a caustic etching bath, or with paper production.

14. The method of claim 1 wherein the membrane is present on the surface of porous hollow fibers.

15. The method of claim 1 wherein the membrane is a nanofiltration membrane.

16. The method of claim 1 wherein the membrane is a reverse-osmosis membrane.

17. The method of claim 1 wherein each aryl residue is an aryl group that is optionally substituted with one or more substituents independently selected from cyano, halo, hydroxy, mercapto, nitro, carboxy, sulfo, $(C_1\text{-}C_{20})$alkyl, $(C_1\text{-}C_{20})$alkoxy, $(C_1\text{-}C_{20})$alkoxycarbonyl, $(C_1\text{-}C_{20})$alkanoyloxy, or —$NR_aR_b$, wherein $R_a$ and $R_b$ may be the same or different and are chosen from hydrogen $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy, or wherein $R_a$ and $R_b$ together with the nitrogen to which they are attached form a pyrrolidino, piperidino, morpholino, or thiomorpholino ring; wherein each $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy is optionally substituted with one or more cyano, halo, hydroxy, mercapto, nitro, carboxy, sulfo, oxo (=O), thioxo (=S) or —$NR_aR_b$ and wherein one or more carbons of each $(C_1\text{-}C_{20})$alkyl, $(C_1\text{-}C_{20})$alkoxy, $(C_1\text{-}C_{20})$alkoxycarbonyl, and $(C_1\text{-}C_{20})$alkanoyloxy can optionally be replaced with —O—, —S—, or —$NR_c$—, wherein each $R_c$ is independently hydrogen, $(C_1\text{-}C_6)$alkyl, $(C_1\text{-}C_6)$alkoxy, $(C_1\text{-}C_6)$alkoxycarbonyl, and $(C_1\text{-}C_6)$alkanoyloxy.

18. The method of claim 1 wherein each aryl residue is a heteroaryl group that is optionally substituted with one or more substituents independently selected from cyano, halo, hydroxy, mercapto, nitro, carboxy, sulfo, $(C_1-C_{20})$alkyl, $(C_1-C_{20})$alkoxy, $(C_1-C_{20})$alkoxycarbonyl, $(C_1-C_{20})$alkanoyloxy, or $-NR_aR_b$, wherein $R_a$ and $R_b$ may be the same or different and are chosen from hydrogen $(C_1-C_{20})$alkyl, $(C_1-C_{20})$alkoxy, $(C_1-C_{20})$alkoxycarbonyl, and $(C_1-C_{20})$alkanoyloxy, or wherein $R_a$ and $R_b$ together with the nitrogen to which they are attached form a pyrrolidino, piperidino, morpholino, or thiomorpholino ring; wherein each $(C_1-C_{20})$alkyl, $(C_1-C_{20})$alkoxy, $(C_1-C_{20})$alkoxycarbonyl, and $(C_1-C_{20})$alkanoyloxy is optionally substituted with one or more cyano, halo, hydroxy, mercapto, nitro, carboxy, sulfo, oxo (=O), thioxo (=S) or $-NR_aR_b$ and wherein one or more carbons of each $(C_1-C_{20})$alkyl, $(C_1-C_{20})$alkoxy, $(C_1-C_{20})$alkoxycarbonyl, and $(C_1-C_{20})$alkanoyloxy can optionally be replaced with $-O-$, $-S-$, or $-NR_c-$, wherein each $R_c$ is independently hydrogen, $(C_1-C_6)$alkyl, $(C_1-C_6)$alkoxy, $(C_1-C_6)$alkoxycarbonyl, and $(C_1-C_6)$alkanoyloxy.

19. The method of claim 1 wherein the aryl residues that are terminally-linked are residues of benzenedisulfonyl chloride, naphthalene trisulfonyl chloride, or benzenetrisulfonyl chloride.

20. The method of claim 1 wherein the polysulfonamide matrix is layered or coated by interfacial polymerization on at least one side of a support material to form a composite membrane.

21. The method of claim 20 wherein the support material is an ultrafiltration membrane.

22. The method of claim 20 wherein the support material is a porous polyphenylene sulfide material.

23. The method of claim 22 wherein the composite membrane is part of a spiral wound module.

24. The method of claim 23 wherein the permeate is recycled in a closed loop Bayer process.

* * * * *

UNITED STATES PATENT AND TRADEMARK OFFICE
CERTIFICATE OF CORRECTION

PATENT NO.      : 7,575,687 B2  
APPLICATION NO. : 11/495810  
DATED           : August 18, 2009  
INVENTOR(S)     : Kurth et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 329 days.

Signed and Sealed this

Seventh Day of September, 2010

David J. Kappos  
*Director of the United States Patent and Trademark Office*